United States Patent
Ciasulli et al.

(10) Patent No.: US 8,757,567 B2
(45) Date of Patent: Jun. 24, 2014

(54) BRACKET FOR PHOTOVOLTAIC MODULES

(75) Inventors: John Ciasulli, San Fancisco, CA (US); Jason Jones, Berkeley, CA (US)

(73) Assignee: SunPower Corporation, San Jose, CA (US)

( * ) Notice: Subject to any disclaimer, the term of this patent is extended or adjusted under 35 U.S.C. 154(b) by 308 days.

(21) Appl. No.: 12/772,756

(22) Filed: May 3, 2010

(65) Prior Publication Data

US 2011/0265860 A1 Nov. 3, 2011

(51) Int. Cl.
| | |
|---|---|
| A47B 96/06 | (2006.01) |
| A47G 29/00 | (2006.01) |
| A47K 1/00 | (2006.01) |
| E04G 3/00 | (2006.01) |
| E04G 5/06 | (2006.01) |
| F21V 21/00 | (2006.01) |
| F21V 35/00 | (2006.01) |

(52) U.S. Cl.
USPC ..... 248/219.4; 182/224; 182/153; 248/218.4; 248/219.2; 248/247

(58) Field of Classification Search
USPC ........ 248/219.4, 218.4, 219.2, 220.1, 295.11, 248/247, 248, 228.1, 903, 909, 216.4, 300; 182/153, 224
See application file for complete search history.

(56) References Cited

U.S. PATENT DOCUMENTS

| | | | |
|---|---|---|---|
| 1,938,818 A * | 12/1933 | Erickson et al. | 4/595 |
| 2,865,588 A * | 12/1958 | McCartney | 248/231.81 |
| 3,370,675 A * | 2/1968 | Larson | 182/224 |
| 4,341,029 A * | 7/1982 | Heard | 40/607.12 |
| 4,461,370 A * | 7/1984 | Connell | 182/153 |
| 4,508,194 A * | 4/1985 | Freewalt et al. | 182/153 |
| 4,659,044 A * | 4/1987 | Armstrong | 248/218.4 |
| 5,109,646 A * | 5/1992 | Colonias et al. | 52/712 |
| 5,364,312 A * | 11/1994 | Cunard et al. | 472/118 |
| 5,505,788 A | 4/1996 | Dinwoodie | |
| 6,061,978 A | 5/2000 | Dinwoodie et al. | |
| 6,295,781 B1 * | 10/2001 | Thompson | 52/712 |
| RE38,988 E | 2/2006 | Dinwoodie | |
| 7,435,134 B2 | 10/2008 | Lenox | |

(Continued)

FOREIGN PATENT DOCUMENTS

| | | |
|---|---|---|
| JP | 2001-193231 | 7/2001 |
| JP | 2001-193231 A | 7/2001 |

OTHER PUBLICATIONS

International Preliminary Report on Patentability and Written Opinion from PCT/US2011/026089 mailed Nov. 15, 2012, 6 pages.

(Continued)

*Primary Examiner* — Nkeisha Smith

(74) *Attorney, Agent, or Firm* — Blakely, Sokoloff, Taylor & Zafman LLP

(57) ABSTRACT

Brackets for photovoltaic ("PV") modules are described. In one embodiment, a saddle bracket has a mounting surface to support one or more PV modules over a tube, a gusset coupled to the mounting surface, and a mounting feature coupled to the gusset to couple to the tube. The gusset can have a first leg and a second leg extending at an angle relative to the mounting surface. Saddle brackets can be coupled to a torque tube at predetermined locations. PV modules can be coupled to the saddle brackets. The mounting feature can be coupled to the first gusset and configured to stand the one or more PV modules off the tube.

11 Claims, 17 Drawing Sheets

(56) References Cited

U.S. PATENT DOCUMENTS

| | | |
|---|---|---|
| 7,592,537 B1 | 9/2009 | West |
| 7,647,924 B2 | 1/2010 | Hayden |
| 7,677,514 B1 * | 3/2010 | Palmer ............................ 248/250 |
| 7,744,052 B2 * | 6/2010 | Wooten .......................... 248/248 |
| 8,176,595 B2 * | 5/2012 | Huang ........................ 15/250.32 |
| 2008/0017772 A1 * | 1/2008 | Wooten .......................... 248/248 |
| 2008/0217496 A1 * | 9/2008 | Wooten .......................... 248/248 |
| 2009/0211829 A1 * | 8/2009 | Horgas .......................... 180/232 |

OTHER PUBLICATIONS

PCT International Search Report and Written Opinion for International Application No. PCT/US2011/026089 mailed Dec. 7, 2011, 9 pages.

* cited by examiner

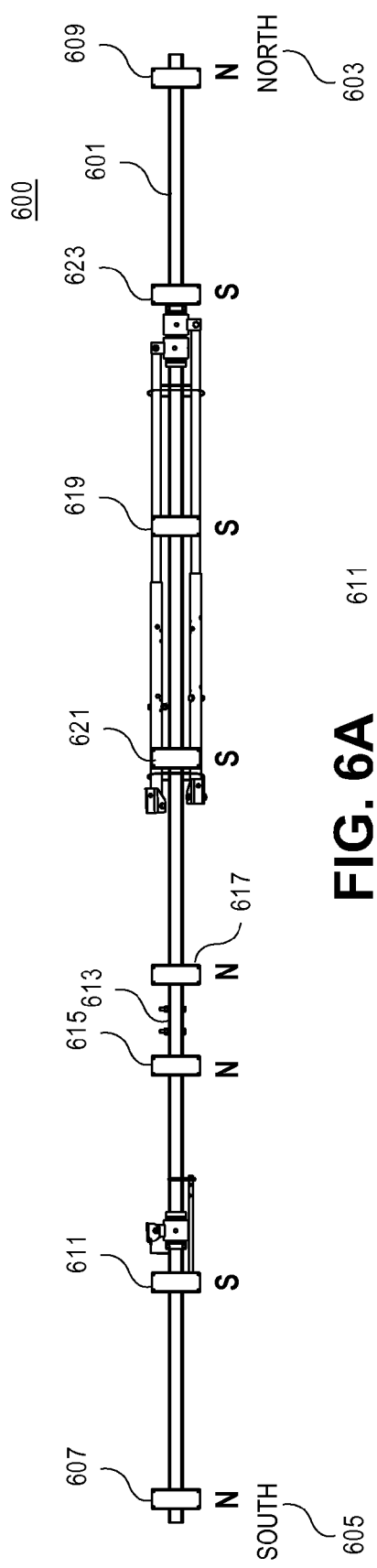
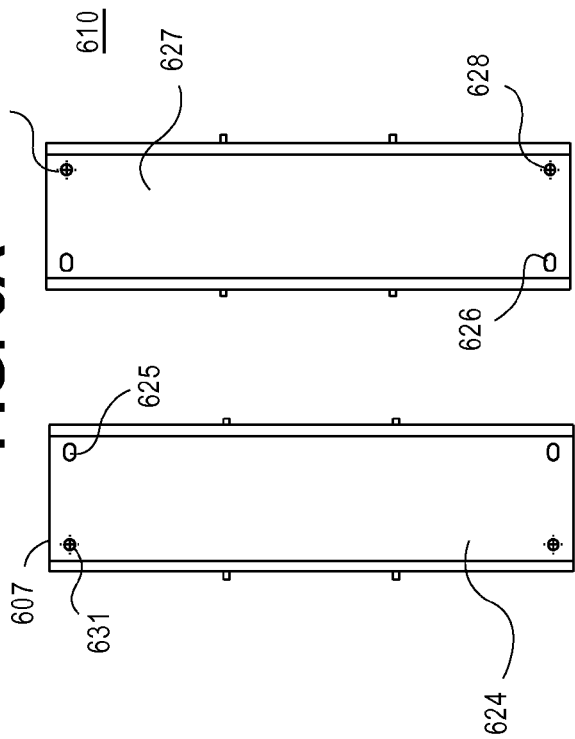
FIG. 6A
FIG. 6B

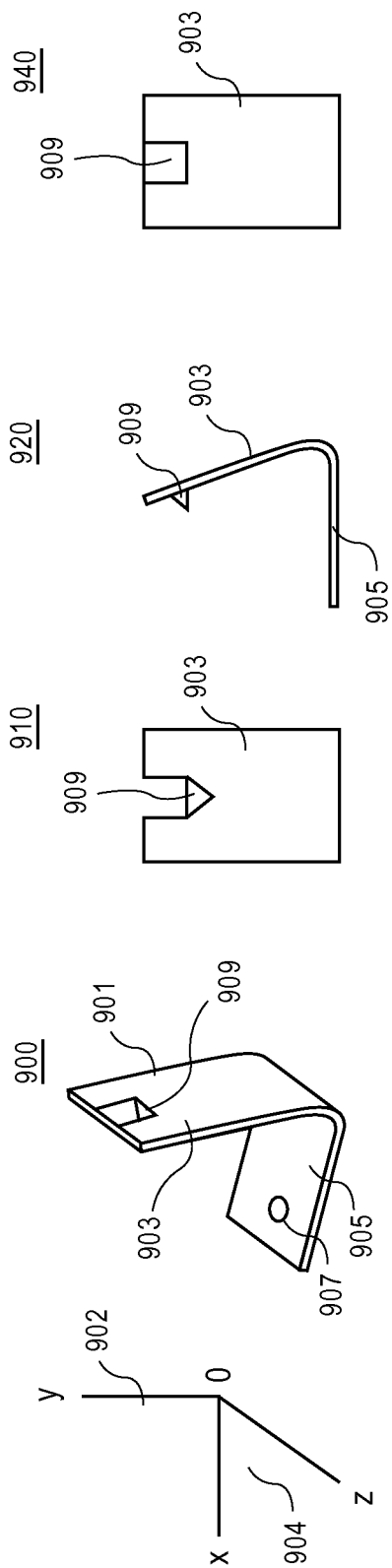
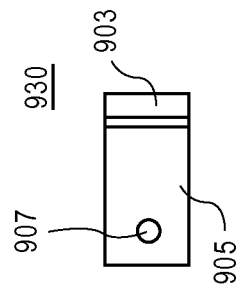
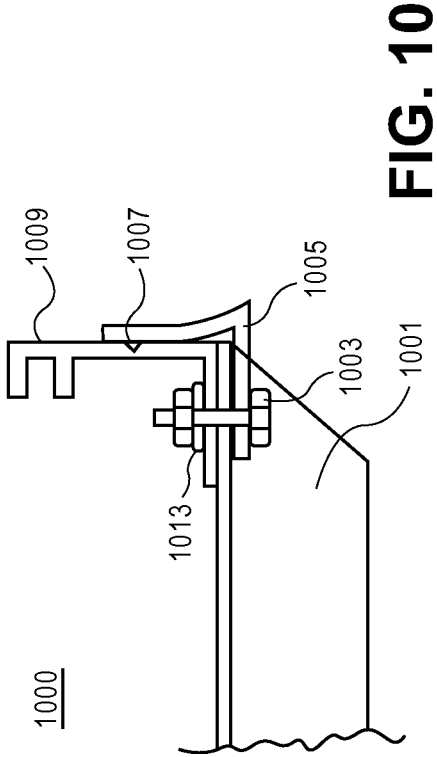

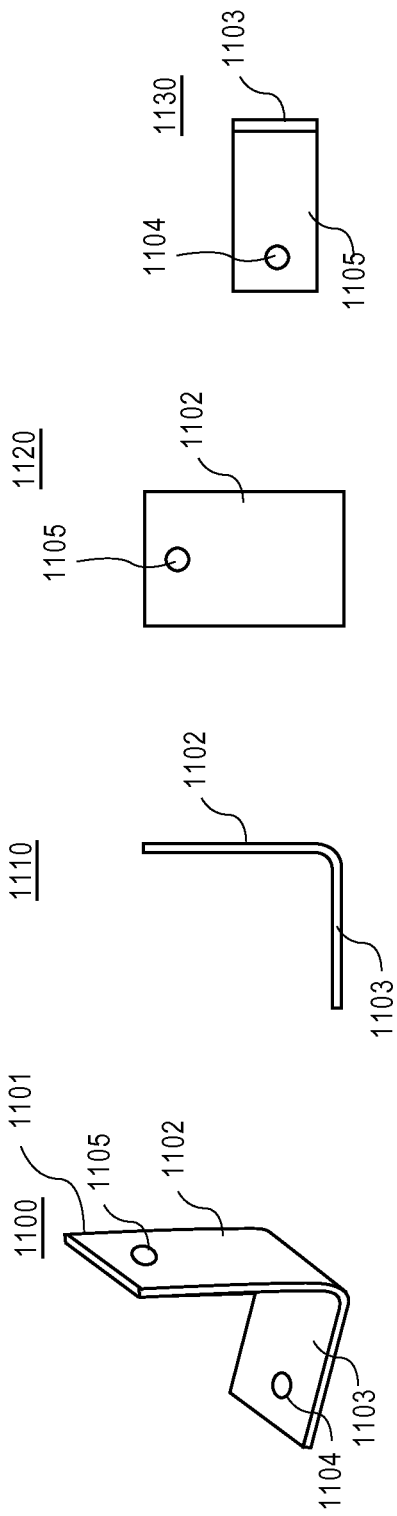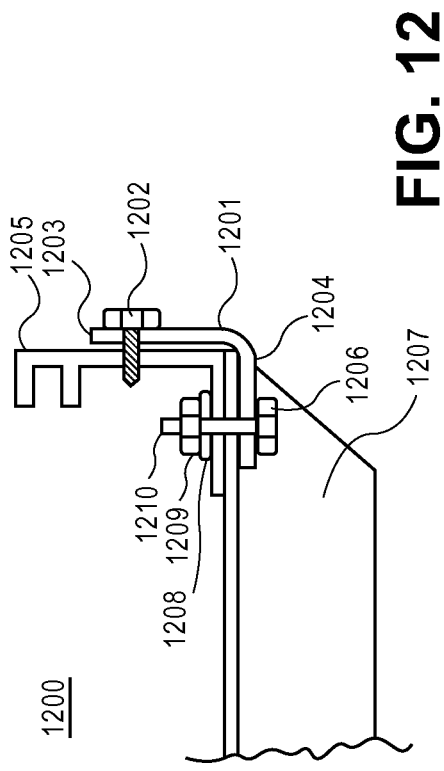

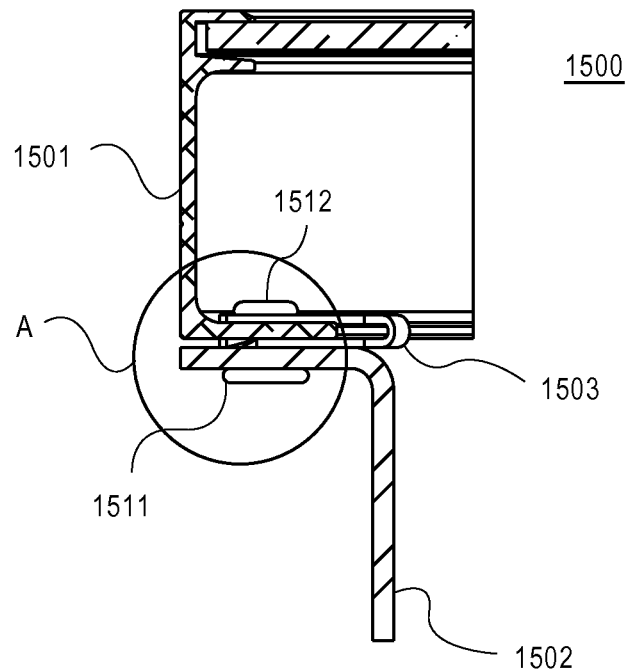
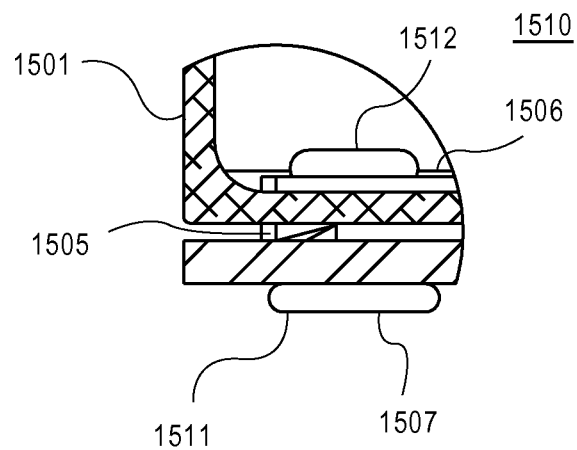
INSERT A
FIG. 15

BRACKET FOR PHOTOVOLTAIC MODULES

The invention described herein was made with Governmental support under contract number DE-FC36-07GO17043 awarded by the United States Department of Energy. The Government may have certain rights in the invention.

FIELD

At least some embodiments of the present invention relate generally to photovoltaic ("PV") systems, and more particularly to providing support for photovoltaic modules.

BACKGROUND

Typically, photovoltaic cells, commonly known as solar cells, are devices to convert solar radiation into electrical energy. Generally, solar cells are fabricated on a semiconductor wafer or substrate using semiconductor processing techniques to form a p-n junction near a surface of the substrate. Solar radiation impinging on the surface of the substrate creates electron and hole pairs in the bulk of the substrate, which migrate to p-doped and n-doped regions in the substrate, thereby generating a voltage differential between the doped regions. The doped regions are coupled to metal contacts on the solar cell to direct an electrical current from the cell to an external circuit coupled thereto. Generally, an array of solar cells, each solar cell interconnected, is mounted on a common or shared platform to provide a photovoltaic module. A plurality of photovoltaic modules or module groups may be electrically coupled to an electrical power distribution network, forming a photovoltaic system.

Typically, photovoltaic module composed of a photovoltaic laminate may be relatively large and readily breakable. Installing such a photovoltaic module, e.g. on a large-scale power plant, may require paying a lot of attention to tolerances, positioning, and security, and consume a lot of time.

Additionally, PV modules may need to be reliably grounded. Currently, grounding the PV modules requires pins on the structure to pierce the anodization of the aluminum frames of the PV modules. Typically, this pin interface lies between the two faces and is not obviously engaged for inspection. Furthermore, relative motion between a grounding pin and the surface of the PV module that the pin contacts may wear down the material of the surface under the pin. Wearing down the material of the surface under the pin may cause an increase in the resistance of the path between the PV module and ground.

BRIEF DESCRIPTION OF DRAWINGS

The present invention is illustrated by way of example and not limitation in the figures of the accompanying drawings in which like references indicate similar elements.

FIG. 6A shows a top view of an exemplary embodiment of a photovoltaic system having saddle brackets on the top of a torque tube.

FIG. 6B shows a top view of an exemplary embodiment of two saddle brackets oriented relative to each other in opposite directions.

FIG. 9A shows a dimetric view of an exemplary embodiment of a grounding washer to ground a photovoltaic module.

FIG. 9B is a front view of an exemplary embodiment of the grounding washer.

FIG. 9C is a side view of an exemplary embodiment of the grounding washer.

FIG. 9D is a top view of an exemplary embodiment of the grounding washer.

FIG. 9E is a back view of an exemplary embodiment of the grounding washer.

FIG. 10 is a view of one exemplary embodiment of a photovoltaic system having a grounding washer.

FIG. 11A shows a dimetric view of another exemplary embodiment of a grounding washer to ground a photovoltaic module.

FIG. 11B is a side view of an exemplary embodiment of the grounding washer.

FIG. 11C is a front view of an exemplary embodiment of the grounding washer.

FIG. 11D is a top view of an exemplary embodiment of the grounding washer.

FIG. 12 is a view of another exemplary embodiment of a photovoltaic system having a grounding washer.

FIG. 15 is a view of another exemplary embodiment of a photovoltaic system having a grounding washer.

DETAILED DESCRIPTION

Figure 1:
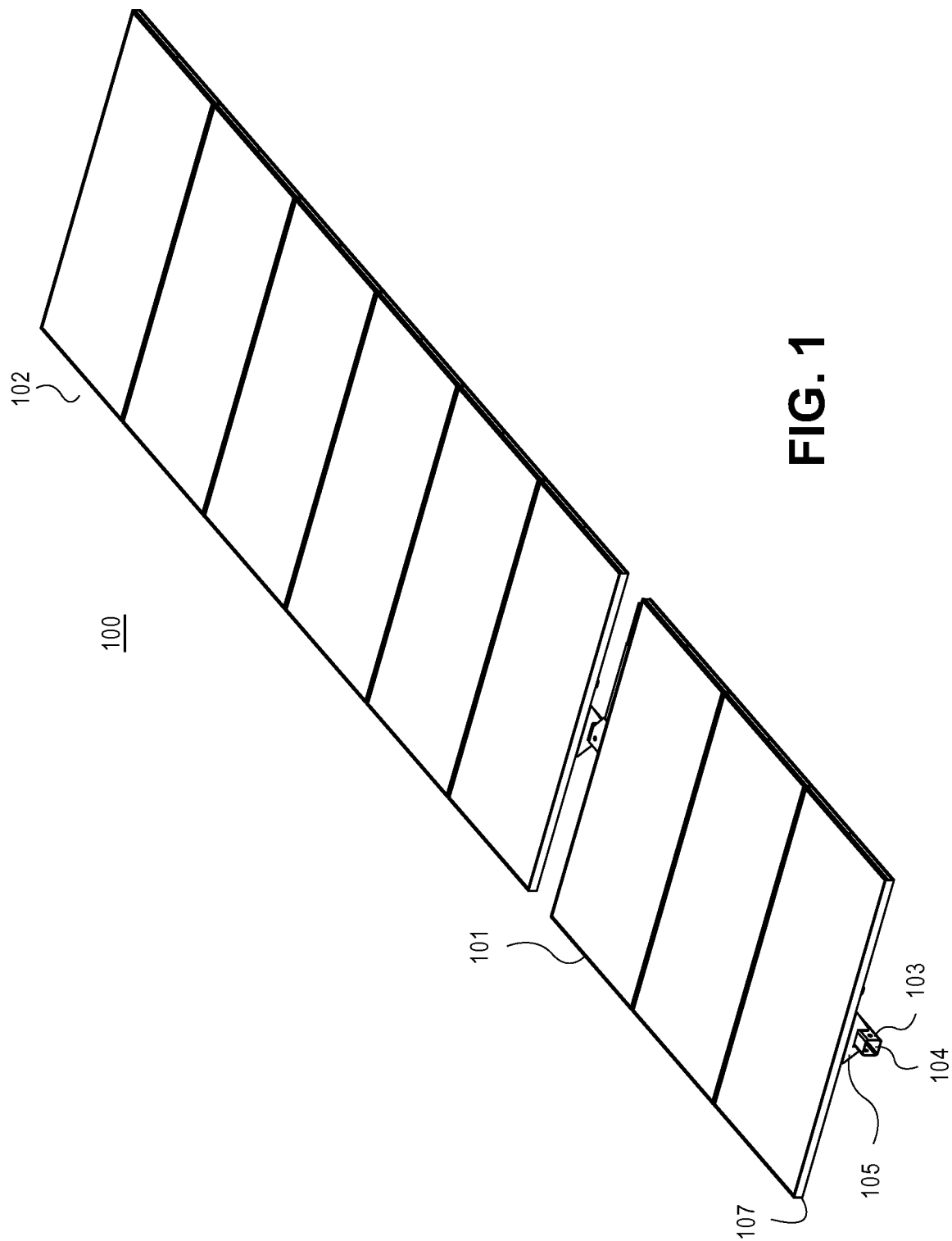
FIG. 1 shows a dimetric view of an exemplary embodiment of a photovoltaic system.

Methods and apparatuses to support photovoltaic ("PV") modules are described herein. The embodiments of the invention will be described with references to numerous details set forth below, and the accompanying drawings will illustrate the embodiments of the invention. The following description and drawings are illustrative of the embodiments of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "at least some embodiments", "another embodiment", or "an embodiment" means that a particular feature, structure, or characteristic described in connection with the embodiment is included in at least at least some embodiments of the present invention. Thus, the appearance of the phrases "in at least some embodiments" or "in an embodiment" in various places throughout the specification are not necessarily all referring to the same embodiment. Furthermore, the particular features, structures, or characteristics may be combined in any suitable manner in one or more embodiments.

Methods and apparatuses to support photovoltaic ("PV") modules are described herein. More specifically, a saddle bracket to support one or more photovoltaic ("PV") modules over a tube is described. In at least some embodiments, a saddle bracket has a mounting surface to support the one or more PV modules over the tube, a gusset coupled to the mounting surface, and a mounting feature coupled to the gusset configured to couple to a side of the tube.

Further, a grounding washer to ground a photovoltaic ("PV") module is described. In at least some embodiments, a grounding washer has a first portion to couple to a support; and a second portion coupled to the first portion to provide a ground path to a PV module. In at least some embodiments, the first portion of the grounding washer is positioned along a first plane, and the second portion of the grounding washer is positioned along a second plane.

Further, a photovoltaic ("PV") system is described. In at least some embodiments, a PV system has a saddle bracket. A PV module can be positioned over the saddle bracket. A grounding washer can be sandwiched between the saddle bracket and the PV module.

In at least some embodiments, a photovoltaic system has a torque tube. The torque tube can have one or more location features. One or more saddle brackets can be positioned over the torque tube at the one or more location features. One or more PV modules can be positioned over the one or more saddle brackets.

In at least some embodiments, a method to manufacture a photovoltaic ("PV") system is described. The method can involve coupling one or more saddle brackets to a torque tube at one or more predetermined locations. The method may further involve coupling one or more PV modules to the one or more saddle brackets.

Methods and apparatuses to support photovoltaic ("PV") modules described herein directly reduce the time of labor necessary to install the PV modules and/or PV panels, while also increasing the security of the PV modules and/or PV panels after installation. Methods and apparatuses to support photovoltaic ("PV") modules described herein can use pre- determined and pre-manufactured locating features and rivets to reduce installation time and eliminate the need for any spacers and special locating tools. Once installed, the rivets are much more difficult to remove and, in this design, harder to get access to without the proper set of specialized tools that increases the security of installation.

FIG. 1 shows a dimetric view 100 of an exemplary embodiment of a PV system. As shown in FIG. 1, PV system 102 includes PV modules, such as a PV module 101. The PV modules can be positioned across the length of a torque tube 103 at predetermined locations. In at least some embodiments, torque tube 103 has location features (not shown). As shown in FIG. 1, torque tube 103 has a cross-section 104. The cross-section of a torque tube, such as cross-section 104 can have a rectangular, square, round, or oval shape. In at least some embodiments, a torque tube, such as torque tube 103, is a round torque tube having a round cross-section.

In at least some embodiments, the PV modules are coupled to saddle brackets, such as a saddle bracket 105, to be positioned over torque tube 103 at the location features. That is, a bracket 105 in a shape of a saddle sits on top of the tube 103 that may act as a spine of the PV system. In at least some embodiments, bracket 105 is riveted into predrilled openings (e.g., holes) in the tube 103 that determine the location of the bracket. In at least some embodiments, bracket 105 is welded at the predetermined location features on the tube 103.

As shown in FIG. 1, the PV modules have frames, such as a frame 107. In at least some embodiments, a frame of a PV module is attached to a saddle bracket positioned over a torque tube at a predetermined location. In at least some embodiments, the PV modules are riveted to a specific set of openings on top of the bracket 105 to locate them in their final position, as set forth in further detail below. In at least some embodiments, a grounding washer (not shown) is coupled to the saddle bracket; and to the frame of the PV module, as described in further detail below. In at least some embodiments, the frame of the PV module includes aluminum.

Figure 2:
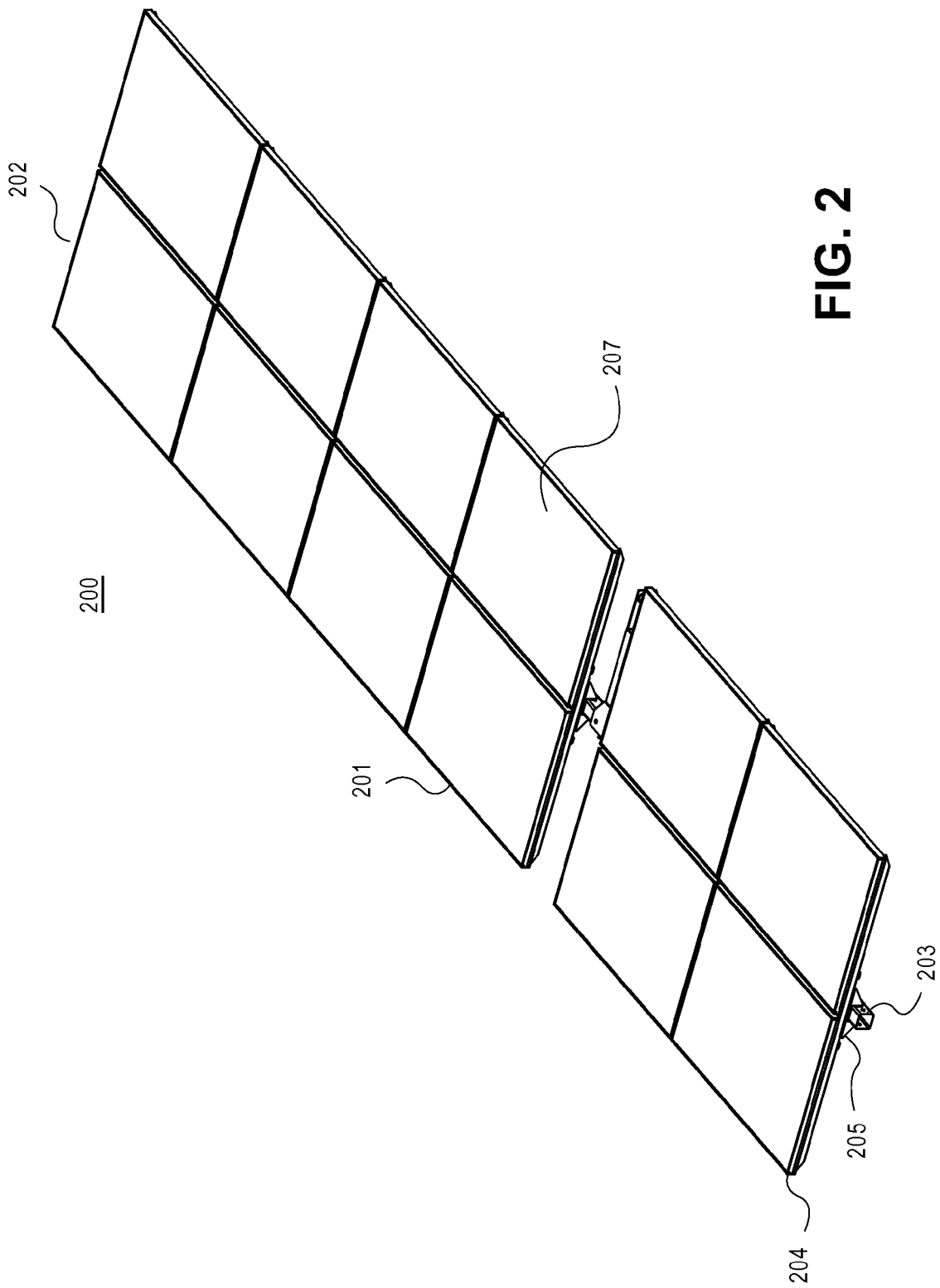
FIG. 2 shows a dimetric view of another exemplary embodiment of a photovoltaic system.

FIG. 2 shows a dimetric view 200 of another exemplary embodiment of a PV system. As shown in FIG. 2, PV system 202 includes PV modules, such as a PV module 201, at one side of a torque tube 203 and the PV modules, such as a PV module 207, at another side of torque tube 203 at predetermined locations. In at least some embodiments, torque tube 203 has location features (not shown).

Each of the PV modules has a frame, such as frame 204. In at least some embodiments, the PV modules are coupled to saddle brackets, such as saddle bracket 205, to be positioned over torque tube 203 at the location features, as set forth above. In at least some embodiments, a frame of a PV module is attached to a saddle bracket positioned over a torque tube. In at least some embodiments, a grounding washer (not shown) is sandwiched between the saddle bracket; and the frame of the PV module. In at least some embodiments, the frame of the PV module includes aluminum.

A PV system having saddle brackets, as described herein allows to reinforce the aluminum frame of the PV module as well as fixture the frame to the tracker (torque tube) while addressing a couple of different constraints, one being locating the module, the other being reducing installation time as well as facilitating the use of rivets and the rivet tool.

In at least some embodiments, at least one end of the torque tube (e.g., torque tube 103 or 203) extends beyond the PV module (e.g., PV module frame 107 or 204), as shown in FIGS. 1 and 2.

Figure 3:
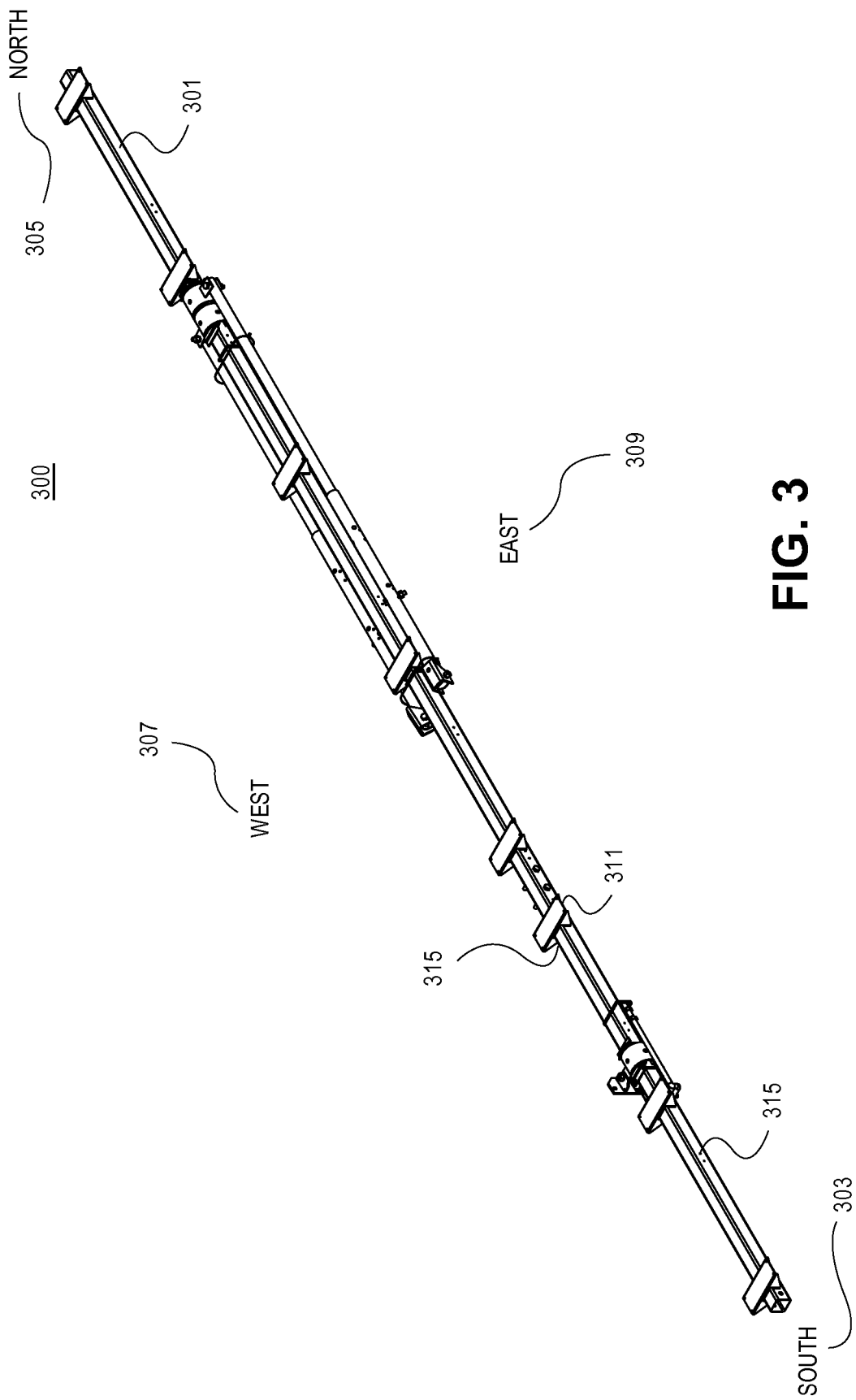
FIG. 3 shows a dimetric view of an exemplary embodiment of a system having saddle brackets over a torque tube.

FIG. 3 shows a dimetric view 300 of an exemplary embodiment of a system having saddle brackets over a torque tube. As shown in FIG. 3, torque tube 305 has a length extending between one direction 303 (e.g., "South") and another direction 305 (e.g., "North"). The torque tube 301 has location features, e.g., a location feature 315, to couple to the saddle brackets, such as a saddle bracket 311 at predetermined positions. For example, saddle bracket 311 at a position 313 can be attached through a location feature (not shown) to the tube. In at least some embodiments, the location features are openings (e.g., holes) in the tube.

As shown in FIG. 3, each of the saddle brackets is positioned substantially symmetrically across the length of the tube 301. A saddle bracket has a mounting feature (not shown) to attach to the tube 301 at one side 309 (e.g., East) and another mounting feature (not shown) to attach to the tube 301 at another side 307 (e.g., West). In at least some embodiments, the saddle brackets are attached to the torque tube during a pre-assembly process at a manufacturing facility. Mounting the PV modules on the saddle brackets positioned over the tracker (torque tube) simplifies the whole assembly line and makes it more efficient.

Figure 4A:
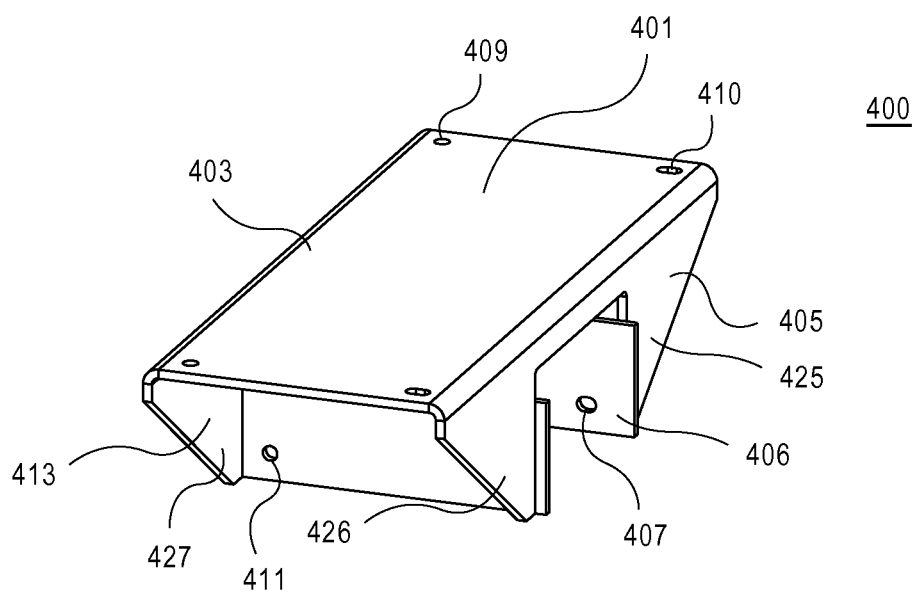
FIG. 4A shows a dimetric view of an exemplary embodiment of a saddle bracket to support one or more photovoltaic modules over a torque tube.

FIG. 4A shows a dimetric view 400 of an exemplary embodiment of a saddle bracket to support one or more photovoltaic ("PV") modules over a torque tube. As shown in FIG. 4A, a saddle bracket 401 has a mounting surface 403 configured to support one or more PV modules over the torque tube. As shown in FIG. 4A, mounting surface 403 has one or more openings, such as openings 409 and 410 to receive a fastener, for example, a rivet, a bolt, a pin, or the like to couple to the one or more PV modules. In at least some embodiments, the openings, such as opening 409, are round holes to receive a fastener to couple to one PV module. In at least some embodiments, the openings, such as openings 410, are slots to receive a fastener to couple to another PV module.

Figure 4B:
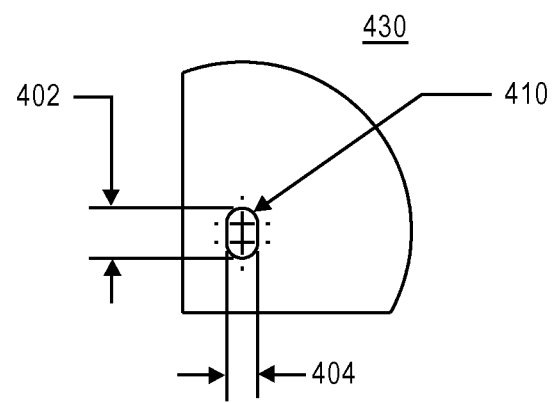
FIG. 4B is an enlarged view of an exemplary embodiment of a slot on the mounting surface of the saddle bracket.
Figure 4C:
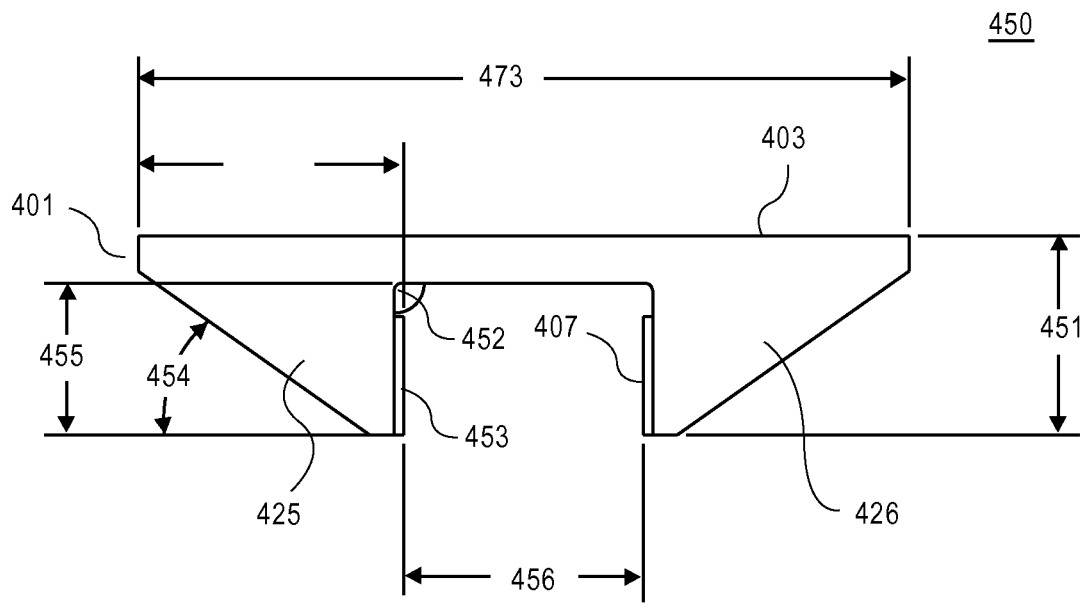
FIG. 4C is a side view of an exemplary embodiment of the saddle bracket.
Figure 4D:
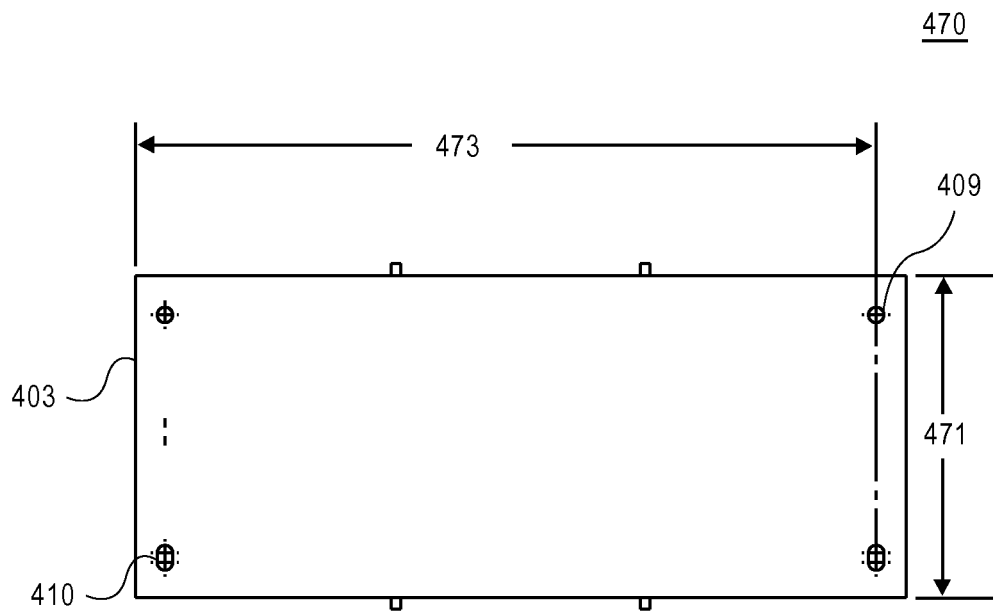
FIG. 4D is a top view of an exemplary embodiment of the saddle bracket.

FIG. 4D is a top view 450 of an exemplary embodiment of saddle bracket 401 to support one or more photovoltaic ("PV") modules over a torque tube. As shown in FIG. 4D, mounting surface 403 has a width 471 and a length 473. In at least some embodiments, length 473 is greater that width 471. In at least some embodiments, the width 471 of the saddle bracket to support one PV module is smaller than the width 471 of the saddle bracket to support a plurality of PV module. As shown in FIG. 4D, mounting surface 403 has a pair of holes (e.g., round openings), such as a hole 409, along the length 473 for one PV module and/or PV panel, and a pair of slots (e.g., oval openings), such as a slot 410, along the length 473 for a next PV module and/or PV panel. As shown in FIG. 4D, a hole and a slot are positioned along width 471. In at least some embodiments, the size of a hole is defined by one measure (e.g., a diameter of the hole). In at least some embodiments, the diameter of a hole on the mounting surface of the saddle bracket is from about 3 millimeters ("mm") to about 7.5 millimeters. More specifically, the size of the hole can be from about 6.5 mm to about 7.5 mm. In at least some embodiments, the size of a slot is defined by at least two measures, as set forth in further detail below with respect to FIG. 4B. A pair of holes and a pair of slots are provided in the mounting surface of the bracket to accommodate for the tolerance in the manufacturing of the PV panel and/or PV module during installation. In at least some embodiments, after the PV panel and/or PV module is attached to a set of holes on one bracket, the PV panel and/or PV module can then be attached to a set of slots on another bracket on the torque tube. In at least some embodiments, the holes on the mounting surface of the saddle bracket position the PV module on the steel structure and the slots allow for the tolerance so there is no need for an alignment.

FIG. 4B is an enlarged view of an exemplary embodiment of a slot on the mounting surface of the saddle bracket. As shown in FIG. 4B, the size of slot 510 is determined by a measure 402 (e.g., "length") and a measure 404 (e.g., "width"). In at least some embodiments, length 402 is greater than width 404 to accommodate for the tolerance during the installation of the PV modules. In at least some embodiments, the length 402 is from about 10 mm to about 25 mm. In at least some embodiments, the width 404 of the slot is substantially equal to the diameter of the hole on the mounting surface 403. In at least some embodiments, the width 404 is from about 5 mm to about 15 mm.

Referring back to FIG. 4A, a gusset 405 and a gusset 413 are coupled to mounting surface 403. Each of the gussets has two legs, such as a leg 425 and a leg 426. In at least some embodiments, each of the legs extends at an angle relative to mounting surface 403. As shown in FIG. 4A, a mounting feature 406 connects leg 425 to a leg (not shown) of gusset 413. Mounting feature 406 is configured to attach to one side of the torque tube. A mounting feature 411 connects a leg 426 of gusset 405 to a leg 427 of gusset 413. Mounting feature 411 is configured to attach to another side of the torque tube. In at least some embodiments, the mounting feature has one or more openings (e.g., holes, slots) to receive a fastener to couple to a predetermined position along the torque tube.

Saddle bracket 401 can serve at least two purposes: it fixtures the PV modules and/or PV panels to the torque tube while also standing the PV modules and/or PV panels off from the top of the tube, to allow for deflection during wind loading.

FIG. 4C is a side view 450 of an exemplary embodiment of saddle bracket 401. As shown in FIG. 4C, saddle bracket has length 473 and a height 451. In at least some embodiments, the length 473 is in a range between about 300 mm to about 325 mm. The saddle bracket 401 has a height 451 to distance the PV modules and/or PV panels off the torque tube. Distancing from the torque tube provides a safety space for deflection of the PV modules and/or PV panels during wind loading. In at least some embodiments, the height 451 of the saddle bracket is determined by the magnitude of the possible deflection of the PV module. Height 451 is greater to support PV modules having greater magnitude of deflection. That is, the saddle bracket can act as a fixture for installation while also being a spacer for the PV modules. Additionally, the saddle bracket having the openings to receive rivets to couple to PV modules and/or panels and to a torque tube acts as a security device by increasing the difficulty to remove the PV panels and/or PV modules.

As shown in FIG. 4C, an internal side of each of the legs 426 and 425 extends at a substantially right angle 452 from mounting surface 403 to secure the saddle bracket on the top of the torque tube. In at least some embodiments, external sides of the legs 426 and 425 can be slanted at an angle 454 relative to the mounting surface, as shown in FIG. 4C, to reduce cost of the material of the gusset. In at least some embodiments, each of the gussets 405 and 413 are made of one piece of a metal sheet (e.g., a steel metal sheet) to increase rigidity while standing off the torque tube. In at least some embodiments, the metal sheet may be a metal, a metal alloy or a compound. The metal sheet may include, for example, steel, copper (Cu), nickel (Ni), cobalt (Co), chromium (Cr), iron (Fe), titanium (Ti), aluminum (Al), or any combination thereof.

As shown in FIG. 4C, mounting feature 407 is attached to leg 426 to couple to one side of the tube (not shown), and mounting feature 453 is attached to leg 425 to couple to another side of the tube (not shown). A space 456 between the mounting features is provided to accommodate the width of the tube (not shown). In at least some embodiments, mounting feature is welded to the legs of the gussets. In at least some other embodiments, the mounting feature is attached by soldering to the legs of the gussets. In at least some other embodiments, the mounting feature is attached to the legs of the gussets by using bolts, rivets, or pins, or other attaching techniques known to one of ordinary skill in the art.

Figure 5:
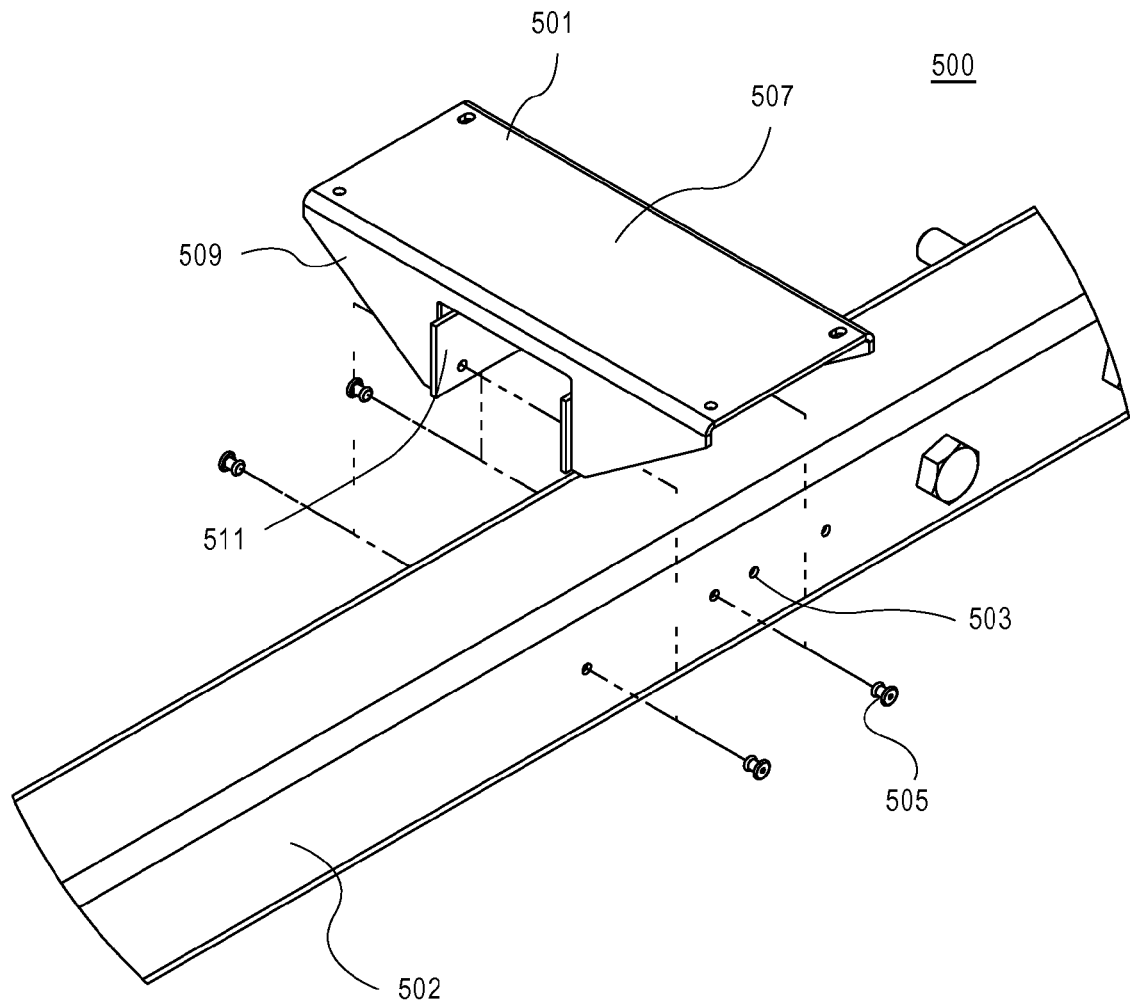
FIG. 5 shows a dimetric view of an exemplary embodiment of positioning a saddle bracket on top of a torque tube.

FIG. 5 shows a dimetric view 500 of an exemplary embodiment of positioning a saddle bracket on top of a torque tube. As shown in FIG. 5, a saddle bracket 501 has a mounting surface 507, two gussets, such as a gusset 509, and mounting features such as a mounting feature 511. The mounting features have openings (not shown) to couple to a tube 502. Tube 502 has openings 503 (e.g., holes) at predetermined locations to receive a rivet, bolt, or pin 505. As shown in FIG. 5, bracket 501 can be secured over the top of the tube 502 by inserting rivet, bolt, or pin 505 through the openings in the mounting features of the bracket 501 into the openings 503.

FIG. 6A shows a top view 600 of an exemplary embodiment of a PV system having saddle brackets on the top of a torque tube. As shown in FIG. 6A, a first sequence of saddle brackets 607, 611, and 615 and a second sequence of saddle brackets 621, 619, 623, and 609 are positioned on top of a torque tube 601 extending between a direction 605 (e.g., "South") and a direction 603 (e.g., "North"). As set forth above, the saddle brackets can be positioned over the torque tube 601 at location features (e.g., pre-drilled holes) (not shown). In at least in some embodiments, orientation of the saddle brackets relative to each other on top of the torque tube 601 has a predetermined pattern. In at least some embodiments, at least two of the saddle brackets on the top of the torque tube 601 are oriented relative to each other in opposite directions.

FIG. 6B shows a top view 610 of an exemplary embodiment of two saddle brackets oriented relative to each other in opposite directions. As shown in FIG. 6B, a saddle bracket 611 is oriented in a direction North, and a saddle bracket 607 is oriented in an opposite direction South. As shown in FIG. 6B, "N" may refer to a saddle bracket with slots at a North side of a torque tube 601, and "S" may refer to a saddle bracket with slots at a South side of a torque tube 601. That is, saddle brackets 611 and 607 are positioned relative each other in opposite directions. As shown in FIG. 6B, saddle bracket 607 has slots, such as slot 625, at a right edge of a mounting surface 624. Saddle bracket 611 has slots, e.g., a slot 626, at a left edge of a mounting surface 627. As shown in FIG. 6B, the slots of the bracket 607 are adjacent to the slots of the bracket 611. As shown in FIG. 6B, the holes of the bracket 607 (e.g., a hole 631) and the holes of the bracket 611 (e.g., a hole 628) are positioned further away from each other.

Referring back to FIG. 6A, edge brackets 607 and 615 of the first sequence are oriented in the same (e.g., "North), and edge brackets 609 and 617 of the second sequence are oriented in the same direction (e.g., "North"), whereas the brackets between the edge brackets, such as bracket 611, or brackets 621, 619, and 623, are oriented in the direction (e.g., "South") that is opposite to the orientation of the edge brackets. In at least some embodiments, at least one of the saddle brackets is narrower than other saddle brackets. For example, the bracket at the end of the torque tube may support one PV module. This edge bracket may be narrower than other brackets.

In at least some embodiments, a saddle bracket can be rotated around its centre installed over a torque tube in a specific pattern so that the PV modules either mate with a hole or a slot that allows for the variance in the size of the PV module.

There may be holes on the frame of the PV module which can be at locations that do not correspond to the locations of the holes on the torque tube. The slots in the mounting surface of the saddle bracket provide a tolerance in coupling the holes on the frames of the PV modules with the holes on the torque tube.

Figure 6C:
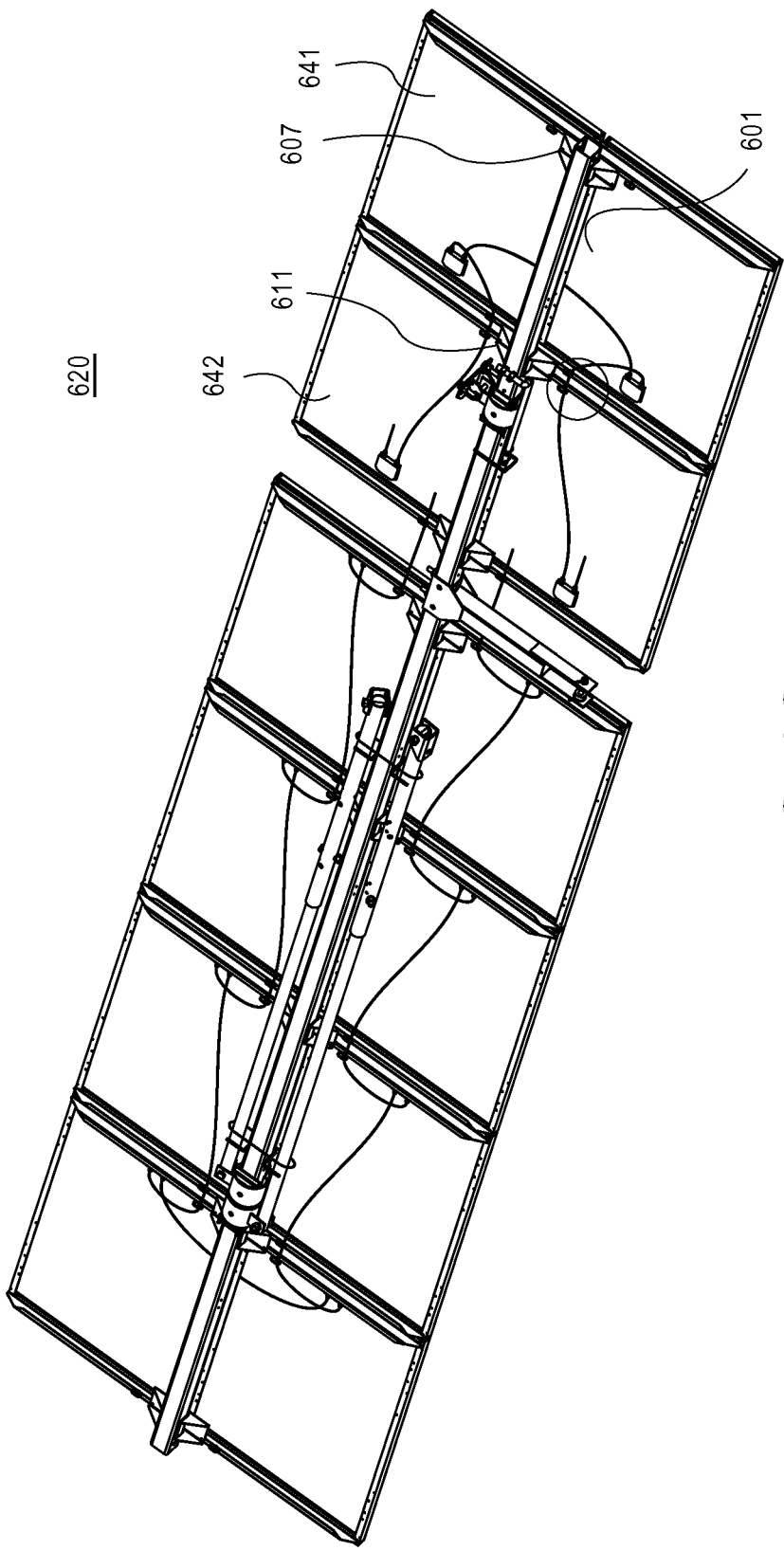
FIG. 6C shows a bottom view of an exemplary embodiment of a photovoltaic system.

FIG. 6C shows a bottom view 620 of an exemplary embodiment of a PV system. As shown in FIG. 6C, two PV modules, such as PV modules 641 and 642 are attached to a middle saddle bracket, such as bracket 611, whereas one PV module, such as PV module 641 is attached to a bracket 607 at an edge of torque tube 601. In at least some embodiments, an edge saddle bracket that supports one PV module is narrower than the middle saddle bracket that supports two PV modules. In at least some embodiments, the edge saddle bracket is tucked underneath the PV module that allows positioning the PV as close to end of the torque tube as possible.

Figure 7:
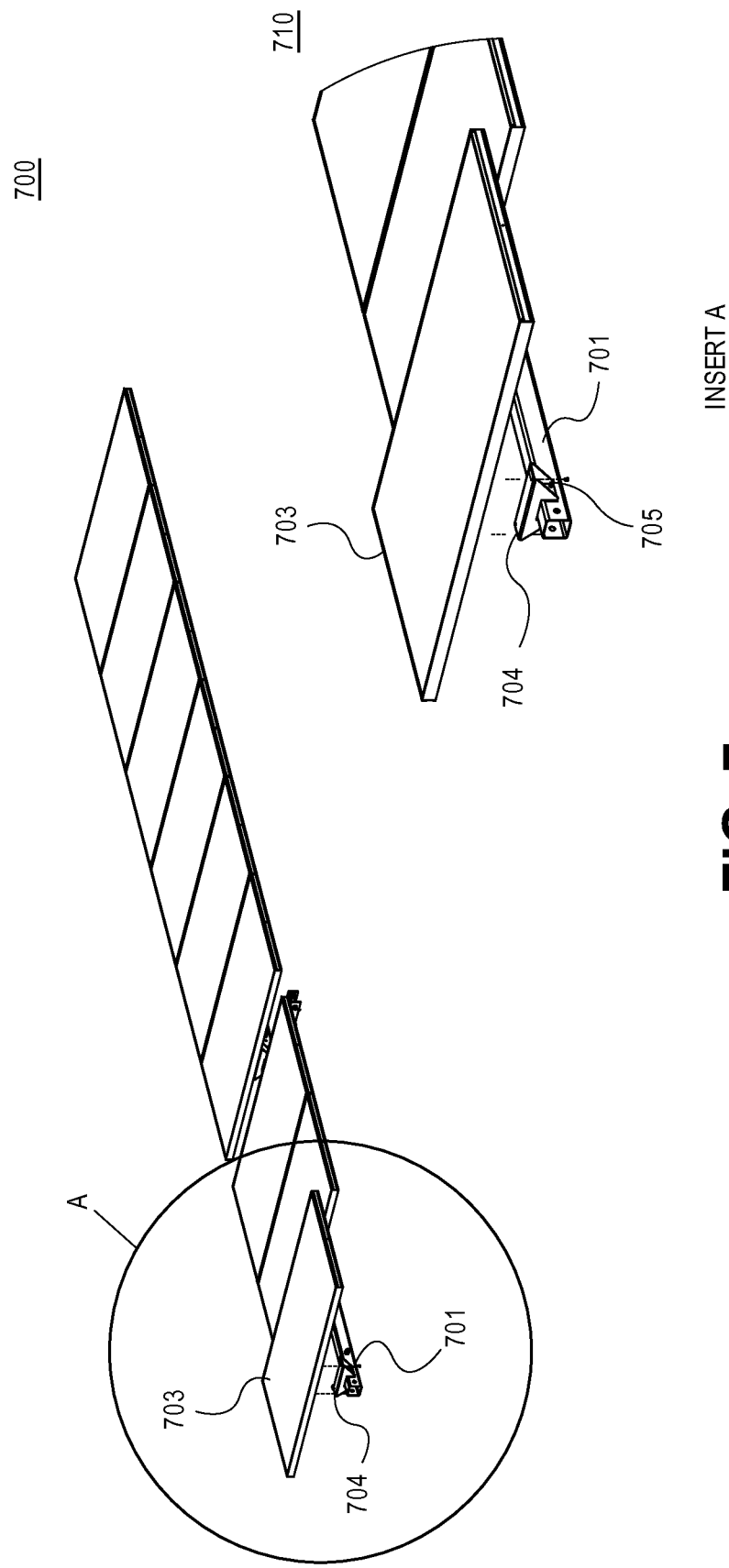
FIG. 7 shows a dimetric view of an exemplary embodiment of attaching a photovoltaic module to a saddle bracket at an edge of a torque tube.

FIG. 7 shows a dimetric view 700 of an exemplary embodiment of attaching a PV module 703 to a saddle bracket 704 at an edge of a torque tube 701. As shown in insert 710 ("A"), pre-drilled holes 705 in the mounting feature of the saddle bracket 704 are aligned with the pre-drilled holes in the torque tube 701 to receive a rivet, bolt, or pin to secure the saddle bracket on top of the tube. Openings (e.g., holes or slots) in the mounting surface of the saddle bracket are aligned with openings in a frame (not shown) of the PV module to receive a rivet, bolt, or pin to secure the PV module on the bracket.

Figure 8:
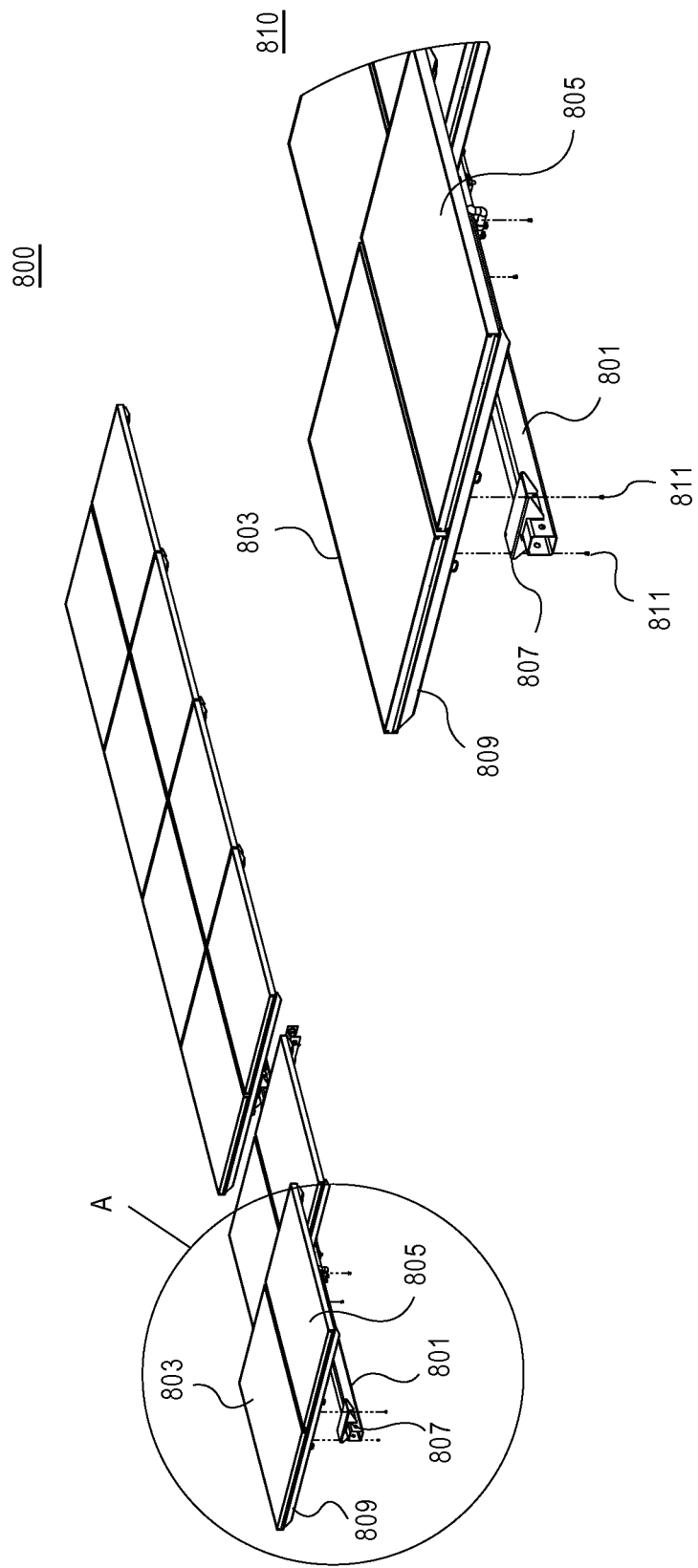
FIG. 8 shows a dimetric view of an exemplary embodiment of attaching two photovoltaic modules to a saddle bracket at an edge of a torque tube.

FIG. 8 shows a dimetric view 800 of an exemplary embodiment of attaching two PV modules 809 and 805 to a saddle bracket 807 at an edge of a torque tube 801. As shown in insert 710 ("A"), modules 809 and 805 are attached to a PV strut 809 to form a PV panel. Openings (e.g., holes or slots) in the mounting surface of the saddle bracket 807 are aligned with openings in the PV strut 809 to receive a rivet, bolt, or pin 811 to secure the PV panel on the bracket 807. Pre-drilled holes (not shown) in the mounting feature of the saddle bracket 807 are aligned with the pre-drilled holes (not shown) in the torque tube 801 to receive a rivet, bolt, or pin.

FIG. 9A shows a dimetric view 900 of an exemplary embodiment of a grounding washer to ground a PV module. FIG. 9B is a front view 910 of an exemplary embodiment of the grounding washer. FIG. 9C is a side view 920 of an exemplary embodiment of the grounding washer. FIG. 9D is a top view 930 of an exemplary embodiment of the grounding washer. FIG. 9E is a back view 940 of an exemplary embodiment of the grounding washer.

A grounding washer 901 has a portion 903 and a portion 905. As shown in FIG. 9A, portion 903 is substantially along a plane 902 formed by axes YOZ, and the portion 905 is substantially along a plane 904 formed by axes XOZ. In at least some embodiments, portion 903 is positioned at an angle relative to portion 905, as shown in FIGS. 9A and 9C. In at least some embodiments, portion 903 is positioned at substantially orthogonal angle relative to portion 905. In at least some embodiments, portion 905 is a washer side of the grounding washer configured to couple to a PV support (e.g., PV strut). In at least some embodiments, the PV support includes a saddle bracket.

Portion 903 is a grounding side of the grounding washer configured to provide a ground path to a PV module. In at least some embodiments, grounding washer 901 is a bent piece of a sheet metal (e.g., steel). In at least some embodiments, portion 903 and portion 905 are portions of the bent piece of the sheet metal. In at least some embodiments, the metal sheet may be a metal, a metal alloy or a compound. The metal sheet may include, for example, steel, copper (Cu), nickel (Ni), cobalt (Co), chromium (Cr), iron (Fe), titanium (Ti), aluminum (Al), or any combination thereof.

As shown in FIGS. 9A and 9D, portion 905 has an opening (e.g., a hole) 907 to receive a bolt, pin, or rivet to couple to the PV support (e.g., a PV strut). As shown in FIGS. 9A, 9B, 9C, and 9E, portion 903 has a pierce point 909 to provide the ground path to the PV module. Typically, PV modules are required to be reliably grounded. Grounding washer 901 having one portion to couple to the PV support and another portion to provide a ground path to the PV module makes the ground path highly visible, and enables to implement redundant ground at very low costs. Grounding washer 901 enables a continuous low resistance electrical contact even with relative motion between the surfaces creating the ground path. As such, the ground path becomes more visible and reliable. In at least some embodiments, a tension indicator is coupled to portion 903 to indicate a tension to a user. In at least some embodiments, the tension indicator can display when the joint is at a designed tension.

FIG. 10 is a view 1000 of one exemplary embodiment of a PV system having a grounding washer. As shown in FIG. 10, a portion of a grounding washer 1005 has an opening (e.g., a hole) to receive a bolt, pin, or rivet 1003 to connect through an opening (e.g., a hole) in a PV strut 1001 to a frame 1009 of a PV module (not shown).

PV frame 1009 has an opening to receive bolt, pin, or rivet 1003. In at least some embodiments, a washer 1013 and a nut 1011 secure bolt 1003 on the other side of PV frame 1009, as shown in FIG. 10. Another portion of grounding washer 1005 has a pierce point 1007 to provide a ground path for the PV module. In at least some embodiments, the portion of the grounding washer 1005 to provide the ground path to the PV module has a spring tension. In at least some embodiments, pierce point 1007 is a self piercing spring point to pierce PV frame 1009. That is, the grounding washer described herein is a dual purpose washer with through hole for attaching to a PV strut and a pierce for grounding to a frame of a PV module. The spring tensioned washer, when tightened down to a steel PV support structure, can pierce an aluminum frame of the PV module on the visible side.

FIG. 11A shows a dimetric view 1100 of another exemplary embodiment of a grounding washer to ground a PV module. FIG. 11B is a side view 1110 of an exemplary embodiment of the grounding washer. FIG. 11C is a front view 1120 of an exemplary embodiment of the grounding washer. FIG. 11D is a top view 1130 of an exemplary embodiment of the grounding washer. A grounding washer 1101 has a portion 1102 and a portion 1103. As shown in FIG. 11A, portion 1102 is substantially along one plane, and portion 1103 is substantially along another plane, as set forth above with respect to FIG. 9A. In at least some embodiments, portion 1102 is positioned at an angle relative to portion 1103, as shown in FIGS. 11A and 11B. In at least some embodiments, portion 1102 is positioned at substantially orthogonal angle relative to portion 1103. In at least some embodiments, portion 1103 is a washer side of the grounding washer configured to couple to a PV support (e.g., PV strut). In at least some embodiments, the PV support includes a saddle bracket. Portion 1102 is a grounding side of the grounding washer configured to provide a ground path to a PV module.

As shown in FIGS. 11A and 11D, portion 1103 has an opening (e.g. a hole) 1104 to receive a bolt, pin, or rivet to couple to the PV support (e.g., a PV strut). As shown in FIGS. 11A and 11C, portion 1102 has an opening (e.g., a hole) 1105 to provide the ground path to the PV module. In at least some embodiments, grounding washer 1101 is a bent piece of a sheet metal (e.g., steel), as set forth above. In at least some embodiments, portion 1102 and portion 1103 are portions of the bent piece of the sheet metal. Typically, the pin interface may not be obviously engaged for inspection, given that it lies between two faces. As shown in FIG. 11, grounding washer 1101 does not require pins on the structure in order to pierce aluminum framed modules and may be easily accessed for inspection. Typically, relative motion between a grounding pin and the surface it contacts may wear down the material under the pin causing an increase in the resistance. The grounding washer 1100 can act as a bearing surface for the bolted or riveted joints. This allows for an even distribution of load due to the bolt or rivet, enabling a more consistent, reliable joint, as it protects the aluminum frame from deforming.

FIG. 12 is a view 1200 of another exemplary embodiment of a PV system having a grounding washer. As shown in FIG. 12, a portion 1203 of grounding washer 1201 has an opening (e.g., a hole) to receive a bolt, pin, or rivet 1202 to provide a ground path for the PV module. As shown in FIG. 12, a portion 1204 of a grounding washer 1201 has an opening (e.g., a hole) to receive a bolt, pin, or rivet 1206 to attach through an opening (e.g., a hole) in a PV strut 1207 to a frame 1205 of a PV module (not shown). PV frame 1205 has an opening to receive bolt, pin, or rivet 1003. In at least some embodiments, a washer 1208 and a nut 1209 secure bolt 1206 on a side 1210 of PV frame 1205, as shown in FIG. 12. In at least some embodiments, the portion 1203 of the grounding washer 1201 to provide the ground path to the PV module has a spring tension.

As set forth above, in at least some embodiments, the grounding washer is a bent piece of sheet metal that has a hole in one side and is bolted to a structure (e.g., a PV strut) that attaches to a PV module as a washer. The grounding washer can be either attached through another hole to the PV module frame with a self drilling screw, bolt, rivet or can use spring tension and a pierce point to make a ground path to the aluminum frame of a PV module. The washer can have a tension indication feature which indicates (e.g., displays) to a user when the joint is properly installed. This can guarantee the most reliable joint possible.

Figure 13A:
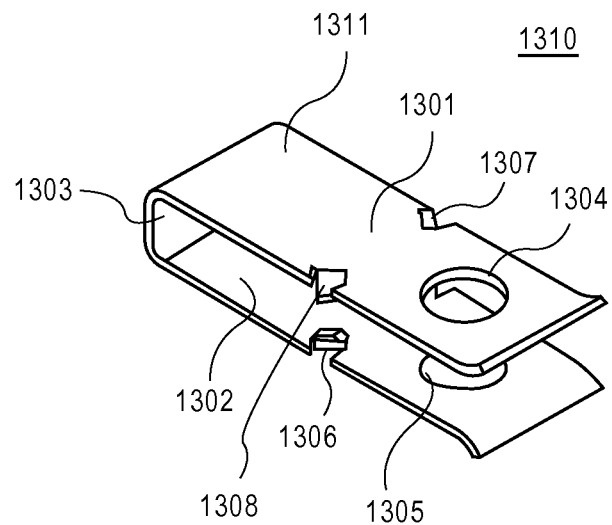
FIG. 13A shows a dimetric view of another exemplary embodiment of a grounding washer to ground a photovoltaic module.
Figure 13B:
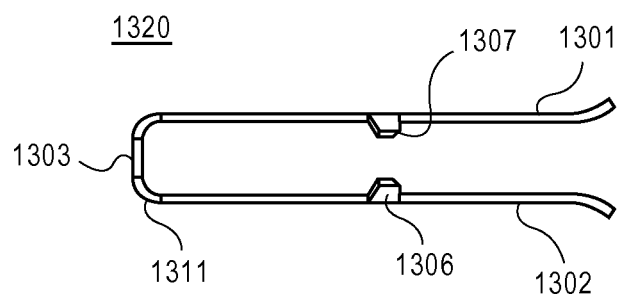
FIG. 13B is a side view of an exemplary embodiment of the grounding washer.

FIG. 13A shows a dimetric view 1310 of another exemplary embodiment of a grounding washer to ground a PV module. FIG. 13B is a side view 1320 of an exemplary embodiment of the grounding washer. As shown in FIGS. 13A and 13B, a grounding washer 1311 has a connector 1303 connecting a portion 1301 and a portion 1302. As shown in FIGS. 13A and 13B, portion 1301 is substantially along one plane, and portion 1302 is substantially along another plane, as set forth above. In at least some embodiments, portion 1302 is substantially parallel to portion 1301 to form a clip, as shown in FIGS. 13A and 13B. In at least some embodiments, portion 1301 is attached as a washer to a PV support (e.g., PV strut) and portion 1302 to provide a ground path to a PV module is attached as another washer to a frame of the PV module. In other words, grounding washer 1311 can be a clip positioned around the frame of the PV module and the PV strut, and used as a washer on both sides of the joint.

As shown in FIGS. 13A and 13B, portion 1301 has an opening (e.g. a hole) 1304 to receive a bolt, pin, or rivet to couple to a hole in a PV support (e.g., a PV strut, a mounting surface of a saddle bracket). As shown in FIGS. 13A and 13B, portion 1302 has an opening (e.g., a hole) 1305 to receive a bolt, pin, or rivet to couple the PV support (e.g., a PV strut, a mounting surface of a saddle bracket) to the PV module frame to provide the ground path. In at least some embodiments, a rivet holds the saddle bracket, one side of a grounding washer clip, a PV frame and another side of the clip together. In at least some embodiments, the grounding washer clip is placed on the saddle bracket during a PV system assembly, before attaching the PV module onto the saddle bracket.

Portions 1301 and 1302 may be a rectangular, square, or diamond-like shaped plates. In at least some embodiments, portions 1301 and 1302 has one or more piercing points (e.g., sharp tabs), such as piercing points 1306, 1307, and 1307. The piercing points may be small flanges that stick up on the portion (e.g., portion 1302) of the washer that scratch the anodization of the aluminum frame of the PV module. When the grounding washer is clamped down by, for example, a rivet, the piercing points dig into the aluminum and provide the ground path.

As shown in FIGS. 13A and 13B, piercing points, such as piercing points 1307 and 1308 can be positioned at the opposite edges of the portion 1311. In at least some embodiments, the piercing points, such as piercing points 1306, 1307, and 1308 are self piercing spring points. In at least some embodiments, grounding washer 1311 is a bent piece of a sheet metal, as set forth above. In at least some embodiments, portion 1301 and portion 1302 are portions of the bent piece of the sheet metal.

Figure 14A:
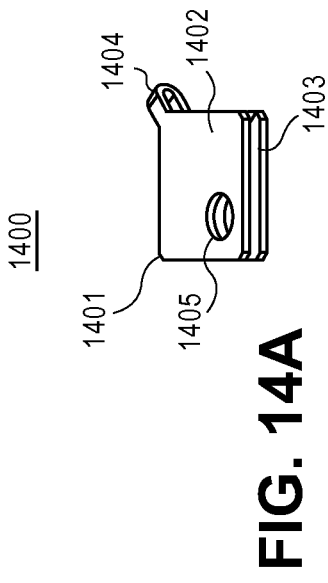
FIG. 14A shows a dimetric view of another exemplary embodiment of a grounding washer to ground a photovoltaic module.
Figure 14E:
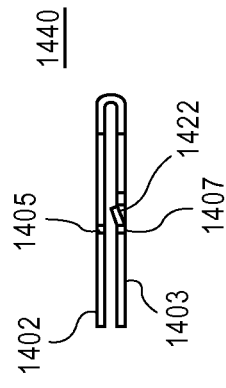
FIG. 14E is a side view of an exemplary embodiment of the grounding washer.
Figure 14B:
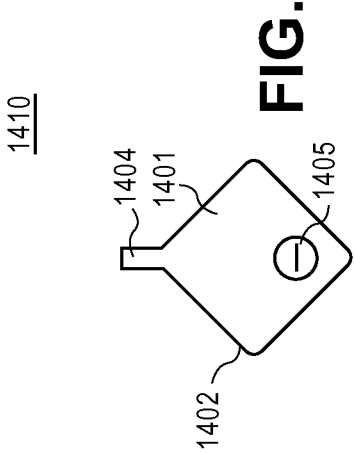
FIG. 14B is a view of an exemplary embodiment of a washer side portion of the grounding washer.
Figure 14C:
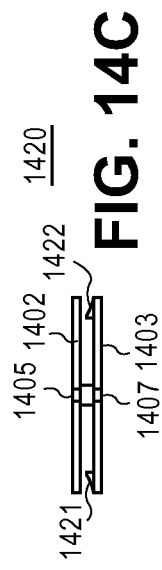
FIG. 14C is a front view of an exemplary embodiment of the grounding washer.
Figure 14D:
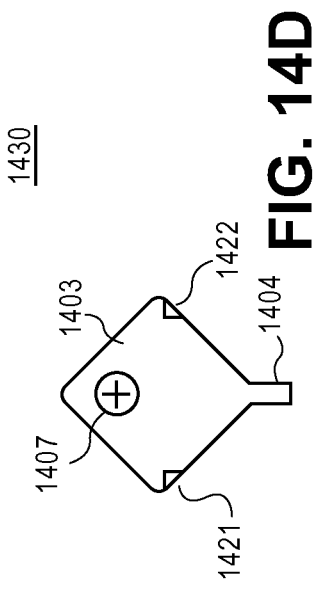
FIG. 14D is a view of an exemplary embodiment of a grounding side portion of the grounding washer.

FIG. 14A shows a dimetric view 1400 of another exemplary embodiment of a grounding washer to ground a PV module. FIG. 14B is a view 1410 of an exemplary embodiment of a washer side portion of the grounding washer. FIG. 14C is a front view 1420 of an exemplary embodiment of the grounding washer. FIG. 14D is a view 1430 of an exemplary embodiment of a grounding side portion of the grounding washer. FIG. 14E is a side view 1440 of an exemplary embodiment of the grounding washer. As shown in FIGS. 14A and 14E, a grounding washer 1401 has a connector ("spine") 1404 connecting a washer side portion 1402 and a grounding side portion 1403. As shown in FIGS. 14A, 14C, and 14E, washer side portion 1402 is substantially along one plane, and grounding side portion 1403 is substantially along another plane, as set forth above. In at least some embodiments, washer side portion 1402 is substantially parallel to grounding side portion 1403 to form a clip, as shown in FIGS. 14A and 14E. In at least some embodiments, washer side portion 1402 is attached as a washer to a PV support (e.g., PV strut) and grounding side portion 1403 provides a ground path to a PV module. The grounding side portion 1403 can be attached to a frame of the PV module. In at least some embodiments, grounding washer 1401 acts as a clip around the frame of the PV module and the PV strut, and used as a washer on both sides of the joint.

As shown in FIGS. 14A and 14B, portion 1402 has an opening (e.g. a hole) 1405 to receive a bolt, pin, or rivet to couple to a PV support (e.g., a PV strut). As shown in FIGS. 14A and 14D, portion 1403 has an opening (e.g., a hole) 1407 to receive a bolt, pin, or rivet to couple to the PV module frame to provide the ground path. Portions 1401 and 1402 may be a substantially rectangular, an indented square, or diamond-like shaped plates. In at least some embodiments, portion 1403 has piercing points (e.g., sharp tabs) 1421 and 1422. As shown in FIGS. 13A and 13B, piercing points 1421 and 1422 are positioned at the adjacent edges of the portion 1403. In at least some embodiments, the piercing points, such as piercing points 1306, 1307, and 1307 are self piercing spring points. In at least some embodiments, connector 1404 is welded to portions 1402 and 1403. In at least some embodiments, grounding washer 1311 is formed from a bent piece of a sheet metal, as set forth above. In at least some embodiments, connector 1404 is attached to portions 1402 and 1403 using soldering, gluing, or any other attaching technique known to one of ordinary skill in the art. In at least some embodiments, a tension indicator (not shown) is coupled to the portion 1403 to indicate a tension to a user.

FIG. 15 is a view 1500 of another exemplary embodiment of a PV system having a grounding washer. One portion of grounding washer 1503 has an opening (e.g., a hole) (not shown) to receive a bolt, pin, or rivet 1512 to attach to a frame 1501 of a PV module (not shown). Another portion of grounding washer 1503 has an opening (e.g., a hole) (not shown) to receive bolt, pin, or rivet 1512 to attach through an opening (e.g., a hole) (not shown), to a PV strut 1502 at a side 1511.

FIG. 15 has an insert 1510 showing an enlarged view of the portion A of view 1500. As shown in insert 1510, grounding washer 1503 is a clip positioned around a portion of PV frame 1501. In at least some embodiments, sharp tabs 1505 of the grounding washer 1503 are installed between PV module frame 1501 and PV strut 1502.

Figure 16:
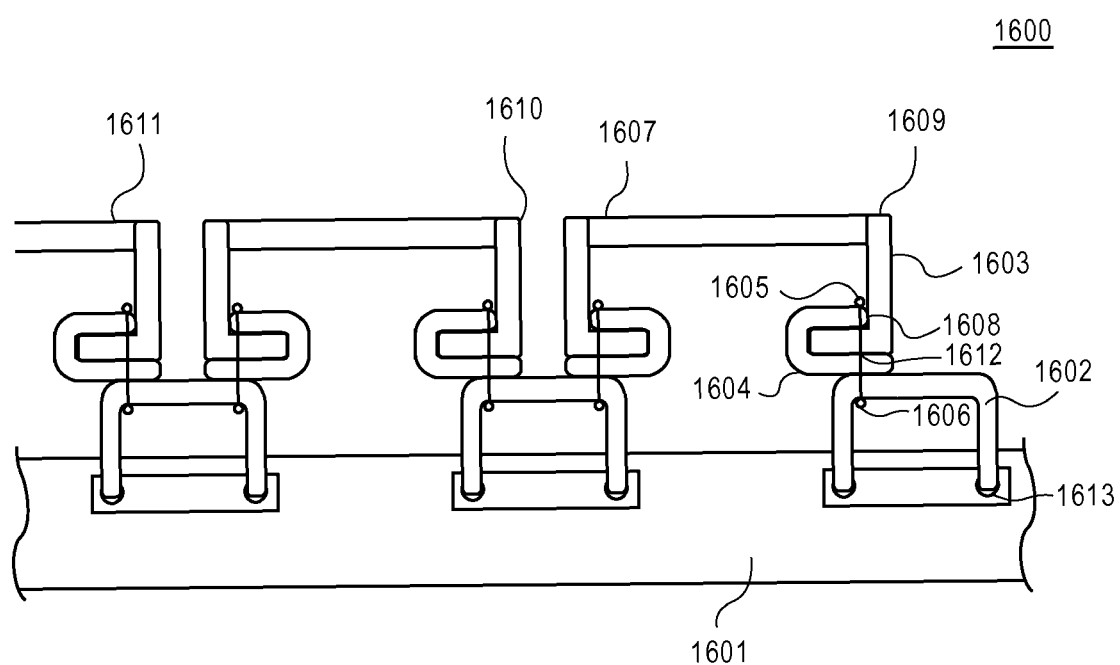
FIG. 16 is a view of an exemplary embodiment of a photovoltaic system having a grounding washer and a saddle bracket over a torque tube.

FIG. 16 is a view 1600 of an exemplary embodiment of a PV system having a grounding washer and a saddle bracket over a torque tube. As shown in FIG. 16, the PV system has one or more saddle brackets, e.g., a saddle bracket 1602 attached to a torque tube 1601 by using one or more first location features, e.g., location features 1613, as set forth above. One or more PV modules, e.g., a PV module laminate 1607 having a frame 1603, are attached to mounting surfaces of the saddle brackets, as set forth above with respect to FIGS. 1-8. As shown in FIG. 16, grounding washers, e.g., a grounding washer 1604 are placed as clips around the PV frame 1603.

As shown in FIG. 16, a portion of grounding washer 1604 is attached to an internal side 1608 of the PV frame 1603 and another portion of grounding washer 1602 is sandwiched between an external side 1612 of PV frame 1603 and the mounting surface of the saddle bracket 1602. In at least some embodiments, the portion of the grounding washer 1604 has a hole to receive a bolt, pin, or rivet 1606 to couple to the saddle bracket, as described above. In at least some embodiments, the portion of the grounding washer sandwiched between the PV frame and the saddle bracket has a self piercing spring point to provide the ground path to the frame of the PV module, as described above. In at least some embodiments, the portion of the grounding washer sandwiched between the PV frame and the saddle bracket has sharp tabs to provide the ground path to the frame of the PV module, as described above. In at least some embodiments, the portion of the grounding washer sandwiched between the PV frame and the saddle bracket has a hole to receive bolt, rivet, or pin 1606 to provide the ground path to the frame 1603 of the PV module. As shown in FIG. 16, PV frame 1603 securely stands off over the torque tube by sitting on top of the saddle bracket, while having the reliable ground path provided through grounding washer 1604. That is, the grounding washer provides a grounding connection, acts as a washer to strengthen the joint between the PV module and the saddle bracket by spreading up a load. Further, the grounding washer stands the PV frame up off the saddle bracket that gives a tolerance against uneven mounting surface of the saddle bracket that removes the stress from the PV frame. Further, positioning the grounding washer clip onto the PV frame allows for its hands free installation.

Figure 17:
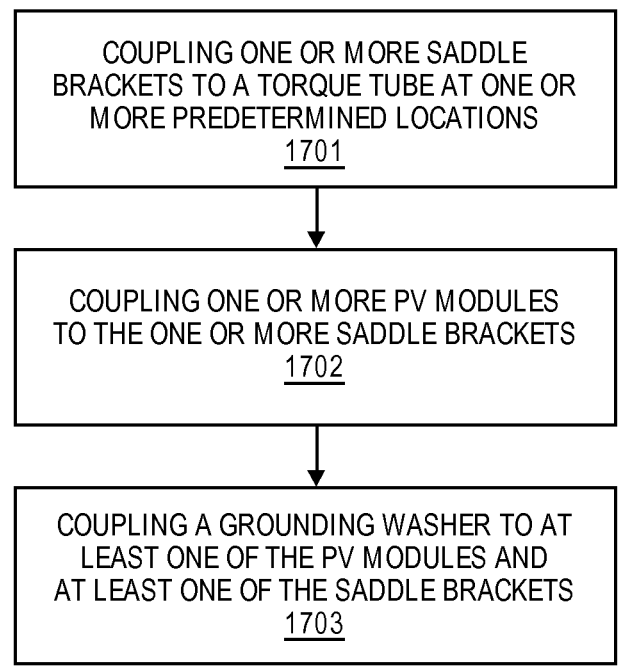
FIG. 17 is a flowchart of one exemplary embodiment of a method to manufacture a photovoltaic system.

FIG. 17 is a flowchart of one exemplary embodiment of a method to manufacture a photovoltaic ("PV") system. Method begins with operation 1701 involving coupling one or more saddle brackets to a torque tube at one or more predetermined locations, as set forth above. The one or more saddle brackets can be coupled to the one or more predetermined locations on the torque tube through openings, as set forth above. In at least some embodiments, a saddle bracket has a gusset; and a mounting surface coupled to the gusset, as set forth above. To couple a saddle bracket to a PV module frame, a fastener, for example, a rivet, a bolt, a pin, or the like can be inserted through an opening in the mounting surface into an opening in a frame of a PV module. The saddle bracket can have a mounting feature coupled to the gusset. In at least some embodiments, coupling the one or more saddle brackets to the torque tube involves inserting a fastener, for example, a rivet, a bolt, a pin, or the like through an opening in the mounting feature into an opening in the torque tube, as set forth above. Method continues with operation 1702 involving coupling one or more PV modules to the one or more saddle brackets. In at least some embodiments, coupling the one or more PV modules to the one or more saddle brackets involves inserting a fastener, for example, a rivet, a bolt, a pin, or the like through an opening in the mounting surface into an opening in a frame of a PV module, as set forth above. At operation 1703 a grounding washer is coupled to at least one of the PV modules and at least one of the saddle brackets, as set forth above.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A saddle bracket to support one or more photovoltaic ("PV") modules over a tube, comprising:
   a PV module mounting surface configured to support the one or more PV modules over the tube, the PV module mounting surface comprising a plurality of openings to receive fasteners to removably attach the one or more PV modules to the PV module mounting surface;
   a first gusset, wherein the first gusset is a plate having a first plate edge directly coupled to a first mounting surface edge of the PV module mounting surface at a substantially perpendicular angle to the PV module mounting surface, and wherein the plate is divided into two first plate sections extending from the first plate edge and separated by a first gap;
   a first mounting feature directly coupled to the first gusset and passing through the first gap, the first mounting feature comprising an opening to receive a fastener to couple to the tube disposed under the PV module mounting surface, having a longitudinal axis substantially parallel to the PV module mounting surface, and passing through the first gap in the first gusset.

2. The saddle bracket as in claim 1, further comprising
   a second gusset, wherein the second gusset is a second plate having a second plate edge directly coupled to a second mounting surface edge of the PV module mounting surface, the second mounting surface edge opposite to the first mounting surface edge, the second plate at a substantially perpendicular angle to the PV module mounting surface, and wherein the second plate is divided into two second plate sections extending from the second plate edge and separated by a second gap; and
   a second mounting feature directly coupled to and spanning between the first gusset and the second gusset and passing through the first gap and the second gap, the second mounting feature comprising a second opening to receive a second fastener to couple to the tube.

3. The saddle bracket as in claim 2, wherein the plurality of openings comprises a plurality of slots proximate to the first mounting surface edge, and a round hole proximate to the second mounting surface edge, the round hole and at least one of the plurality of slots to receive the fasteners to removably attach the one or more PV modules to the PV module mounting surface.

4. The saddle bracket as in claim 2, wherein:
   the plate comprises a first metal sheet with a first rectangular cutout separating the two first plate sections;
   the second plate comprises a second metal sheet with a second rectangular cutout separating the two second plate sections;
   external edges of the two first plate sections extend away from the first plate edge at an inward slanting angle; and
   external edges of the two second plate sections extend away from the second plate edge at an inward slanting angle.

5. The saddle bracket as in claim 2, wherein the first mounting surface edge and the second mounting surface edge each have a length in a range of 300 mm to 325 mm.

6. The saddle bracket as in claim 1, wherein the saddle bracket has a height to distance the PV modules off the tube.

7. The saddle bracket as in claim 1, wherein the first mounting feature is a quadrilateral plate having a first mounting feature edge proximate to the PV module mounting surface and a second mounting feature edge opposite to the first mounting feature edge, wherein the opening of the first mounting feature to receive the fastener to couple to the tube is located nearer to the second mounting feature edge than the first mounting feature edge.

8. The saddle bracket as in claim 1, wherein the mounting feature has at least one opening to receive a fastener to couple to a predetermined position along the tube.

9. The saddle bracket as in claim 1, wherein the mounting feature coupled to the first gusset is configured to stand the one or more PV modules off the tube.

10. The saddle bracket as in claim 1, wherein the plurality of openings comprises at least one slot to receive a fastener to couple a first PV module to the PV module mounting surface and at least one round hole to receive a rivet, a bolt, or a pin to couple a second PV module to the PV module mounting surface.

11. The saddle bracket as in claim 10, wherein the slot to receive the fastener to removably attach the one or more PV modules to the PV module mounting surface has a width substantially equal to a diameter of the hole, and a length in a range of 10 mm to 25 mm.

* * * * *